United States Patent
Moser et al.

(10) Patent No.: US 7,862,639 B2
(45) Date of Patent: Jan. 4, 2011

(54) INTAKE FILTER FOR AN INTERNAL COMBUSTION ENGINE OF A MOTOR VEHICLE

(75) Inventors: Nikolaus Moser, Ditzingen (DE); Andreas Franz, Kornwestheim (DE); Birgit Schimpf, Ludwigsburg (DE); Joerg Hammerschick, Asperg (DE); Klaus Waltenberg, Grossbottwar (DE); Emese Weissenbacher, Marbach/Neckar (DE); Mathias Schuster, Neuhausen (DE); Wolfgang Cedzich, Remseck (DE); Heinz Buehl, Erlenbach (DE); Andreas Steuss, Bietigheim-Bissingen (DE); Juergen Werner, Baltmannsweiler (DE); Harald Spaeth, Benningen (DE); Matthias Gradl, Sesslach (DE); Michael Lechner, Grossheirath (DE); Hansjuergen Linde, Coburg (DE); Uwe Neumann, Weisbaden (DE)

(73) Assignee: Mann + Hummel GmbH, Ludwigsburg (DE)

( * ) Notice: Subject to any disclaimer, the term of this patent is extended or adjusted under 35 U.S.C. 154(b) by 214 days.

(21) Appl. No.: 11/529,714

(22) Filed: Sep. 29, 2006

(65) Prior Publication Data

US 2007/0131194 A1 Jun. 14, 2007

Related U.S. Application Data

(63) Continuation of application No. PCT/EP2005/051486, filed on Mar. 31, 2005.

(30) Foreign Application Priority Data

Mar. 31, 2004 (DE) .................. 10 2004 016 546

(51) Int. Cl.
*B01D 46/00* (2006.01)
(52) U.S. Cl. .................. 55/385.3; 55/498; 55/502; 55/DIG. 28; 123/198 E
(58) Field of Classification Search ............... 55/385.3, 55/318, 497, 498, 502, DIG. 28, 529; 123/198 E; 180/68.3
See application file for complete search history.

(56) References Cited

U.S. PATENT DOCUMENTS

| | | | | | |
|---|---|---|---|---|---|
| 2,881,860 | A | * | 4/1959 | Ternes | 96/383 |
| 2,952,327 | A | * | 9/1960 | Farr | 180/68.3 |
| 3,249,172 | A | * | 5/1966 | De Lorean | 180/68.3 |
| 3,481,117 | A | * | 12/1969 | McKinlay | 55/385.3 |
| 3,641,746 | A | * | 2/1972 | Smith et al. | 55/385.3 |
| 3,673,995 | A | * | 7/1972 | Mangin | 123/552 |
| 4,689,060 | A | * | 8/1987 | Koske | 55/385.3 |
| 4,932,490 | A | * | 6/1990 | Dewey | 180/68.3 |
| 5,147,430 | A | * | 9/1992 | Kidd | 55/385.3 |
| 5,275,636 | A | * | 1/1994 | Dudley et al. | 96/421 |
| 5,400,753 | A | * | 3/1995 | Andress et al. | 123/198 E |
| 5,820,646 | A | * | 10/1998 | Gillingham et al. | 55/488 |

(Continued)

FOREIGN PATENT DOCUMENTS

WO WO2005095783 10/2005

*Primary Examiner*—Duane Smith
*Assistant Examiner*—Minh-Chau T Pham

(57) ABSTRACT

An intake filter for an internal combustion engine for a motor vehicle including an unfiltered air intake region, a filter medium and a filtered air conduit, in which the unfiltered air intake region is arranged beneath the engine hood of the motor vehicle and is attached to the engine hood. The filter medium is tubular body which has a porosity that ensures a sufficient filtration of the intake air for the internal combustion engine.

13 Claims, 6 Drawing Sheets

U.S. PATENT DOCUMENTS

| | | | |
|---|---|---|---|
| 5,954,847 A * | 9/1999 | Shively et al. | 55/385.3 |
| 6,361,574 B1 * | 3/2002 | Decker | 55/317 |
| 6,395,049 B2 * | 5/2002 | Knodler et al. | 55/385.3 |
| 6,544,310 B2 * | 4/2003 | Badeau et al. | 55/385.3 |
| 6,564,768 B2 * | 5/2003 | Bauer et al. | 123/198 E |
| 6,565,620 B1 * | 5/2003 | Greeson | 55/385.3 |
| 6,572,667 B1 * | 6/2003 | Greif et al. | 55/323 |
| 6,955,699 B2 * | 10/2005 | Bergami | 55/385.3 |
| 6,991,664 B2 * | 1/2006 | Riehmann et al. | 55/321 |
| 7,208,025 B2 * | 4/2007 | Pikesh | 55/385.3 |
| 2002/0108359 A1 * | 8/2002 | Powell | 55/482 |
| 2003/0010002 A1 | 1/2003 | Johnson et al. | |
| 2003/0089233 A1 * | 5/2003 | Borla | 95/273 |
| 2003/0182909 A1 * | 10/2003 | Gieseke et al. | 55/385.3 |
| 2004/0255783 A1 | 12/2004 | Graham et al. | |
| 2005/0211095 A1 * | 9/2005 | Zambrano et al. | 95/273 |
| 2006/0260469 A1 * | 11/2006 | Miyagishima et al. | 95/273 |
| 2007/0180800 A1 * | 8/2007 | Bajza et al. | 55/385.3 |
| 2008/0072554 A1 * | 3/2008 | Walz | 55/498 |

* cited by examiner

INTAKE FILTER FOR AN INTERNAL COMBUSTION ENGINE OF A MOTOR VEHICLE

CROSS REFERENCE TO RELATED APPLICATIONS

This application is a continuation of international patent application no. PCT/EP2005/051486, filed Mar. 31, 2005 designating the United States of America and published in German on Oct. 13, 2005 as WO 2005/095783, the entire disclosure of which is incorporated herein by reference. Priority is claimed based on Federal Republic of Germany patent application no. DE 10 2004 016546.7, filed Mar. 31, 2004.

BACKGROUND OF THE INVENTION

The invention relates to an intake filter for an internal combustion engine of a vehicle comprising a dirty air intake area, a filter medium and a clean air pipe, wherein the dirty air intake area is disposed on the underside of the engine hood of the vehicle and is connected thereto.

U.S. Pat. No. 4,932,490 discloses a vehicle with an internal combustion engine. To supply the intake air for the internal combustion engine, an unfiltered air passage is provided on the engine hood to receive the air flowing in from the front of the vehicle. This unfiltered air passage leads to a filter housing in which is disposed a filter element for filtering the dirty air. The clean, filtered air flows through a filtered air passage disposed on the engine hood side to a transfer unit from where it is guided to the internal combustion engine through a flexible hose. When the engine hood is opened, the flexible hose is separated from the clean air passage. The air filter is mounted to the engine hood and can be replaced as needed. To mount the air filter, a corresponding housing is provided, which can be opened.

One drawback of this device is that the housing of the air filter is a rigid structure. Similarly, the unfiltered air- and filtered air-carrying members are specially configured sheet metal parts that are mounted to the engine hood. They cause a stiffening of the engine hood in an area that should be relatively flexible for safety reasons. In addition, a special housing is required for the air filter element, which adds a not inconsiderable amount of weight to the engine hood.

SUMMARY OF THE INVENTION

Accordingly, it is an object of the invention to provide an improved internal combustion engine air filter which is mounted to the engine hood.

Another object of the invention is to provide a hood-mounted intake filter for an internal combustion engine which does not impair the function of the engine hood or require a special housing.

These and other objects are achieved in accordance with the present invention by providing an intake filter for an internal combustion engine of a motor vehicle comprising an unfiltered air intake area, a filter medium, and a filtered air duct, in which the unfiltered air intake area is disposed on the underside of the engine hood of the vehicle and is attached to the engine hood; and in which the filter medium comprises a tubular body having a porosity such that adequate filtering of the intake air for the internal combustion engine is ensured.

Thus, in accordance with the present invention, the filter medium is formed of a tubular body that has a porosity sufficient to ensure adequate filtering of the intake air for the internal combustion engine.

The present invention is advantageous in that the filter system can be accommodated within the engine compartment of a vehicle in a space-saving manner. In particular, the engine hood of the vehicle and the space between the engine hood and the engine can advantageously be used to mount the relatively soft element or elements of a tubular filter body. Due to the relatively large size of the area available, a plurality of tubular elements may be arranged in parallel. The configuration can be adapted to the engine hood structure.

In one embodiment of the invention the proposed tubular body comprises a tubular filter having a diameter ranging from 40 to 80 mm. A tubular filter of this type can be formed of, for example, a nonwoven body, the nonwoven material of which has filtering properties.

It is of course also possible, according to a further embodiment of the invention, to provide the tubular body with a pleated geometry to facilitate a curved installation. The filter element is pleated, for example, by forming a plurality of parallel folds arranged side by side, which extend perpendicularly to the longitudinal axis of the filter.

In accordance with another embodiment of the invention the filter medium is provided on the filtered air side with a resilient support member. This support member may, in particular, comprise a helically extending support wire or a correspondingly configured support grid. Of course, a support member can also be formed of polymeric material as well as of metal.

To prevent the intake of hot engine exhaust, in one advantageous embodiment of the invention, the tubular body may be provided with a cover. This cover ensures that the fresh air to be drawn in flows in at defined points, as for example in the upper area of the radiator grille, and is supplied to the intake filter. The cover also may have acoustic properties, so that it helps reduce the intake noise of the internal combustion engine.

According to another embodiment, the tubular body is a wound filter element which comprises a plurality of groove-like hollow channels with adjacent channels open and closed at alternate ends. Wound filters of this type have the advantage that they have a very short overall length and a large effective filter surface. They are also compact and easy to replace.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
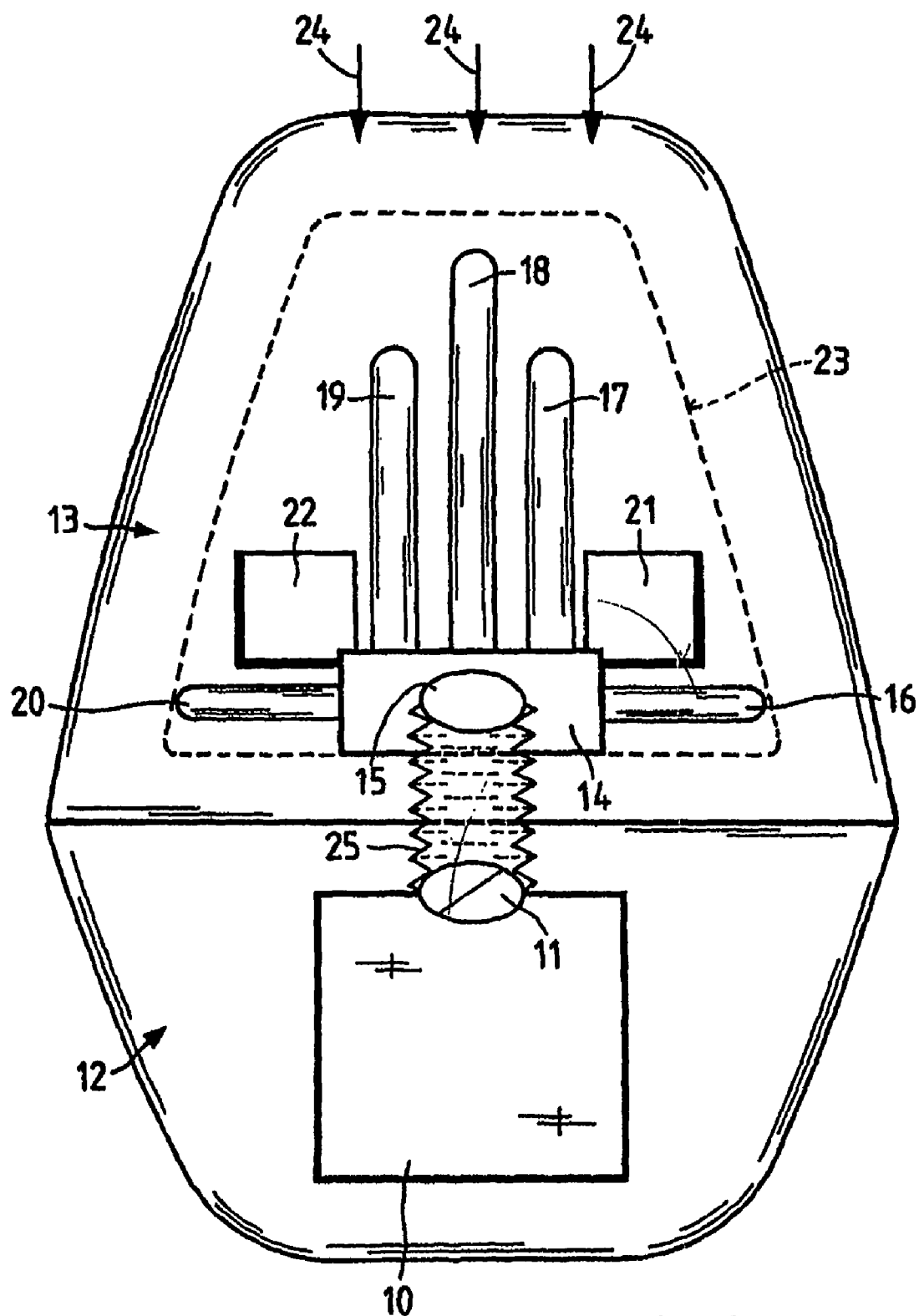
FIG. 1 is a schematic view of the engine compartment of an automobile with hood open.

FIG. 1 schematically illustrates the engine 10 of a motor vehicle. On this engine 10, there is an opening 11 through which the intake air flows in and from where it is distributed to the individual cylinders of the engine. An engine hood 13 is arranged on top of the engine compartment 12. In FIG. 1 the engine hood is shown open so that the underside of the hood is visible. On the underside of hood 13 there is a plenum chamber 14 with a filtered air opening 15. This plenum chamber in turn has openings to the outside, which communicate with tubular filter elements (tubular filters 16, 17, 18, 19, 20). These tubular filters each have a round or oval cross section and are likewise depicted only schematically. In addition to the tubular filters, resonance chambers 21 and 22 are provided, which communicate with the plenum chamber 14 through openings and which are appropriately configured to dampen the intake air noise. The tubular filters and the resonance chambers are covered relative to the engine by a substantially airtight cover 23. In the drawing the cover is merely indicated by a broken line. This cover is open toward the front of the vehicle and toward the front of the engine hood, so that fresh air can flow into the filter area from the front, i.e., from the front of the vehicle, as indicated by arrows 24. This fresh air is cleaned by the tubular filters and made available to the internal combustion engine.

A connection between the clean air opening 15 and the opening 11 for the intake air on the engine 10 is established by closing the engine hood. If desired, both openings may be permanently connected by a flexible connecting hose 25. It is also possible to use suitable interengaging connecting members to produce the elastic connection, which is released when the engine hood is opened, but this requires that the opening 11 be closed when the engine hood is open. Closure of opening 11 can be accomplished, for example, by a suitable diaphragm or flap over the opening.

Figure 2:
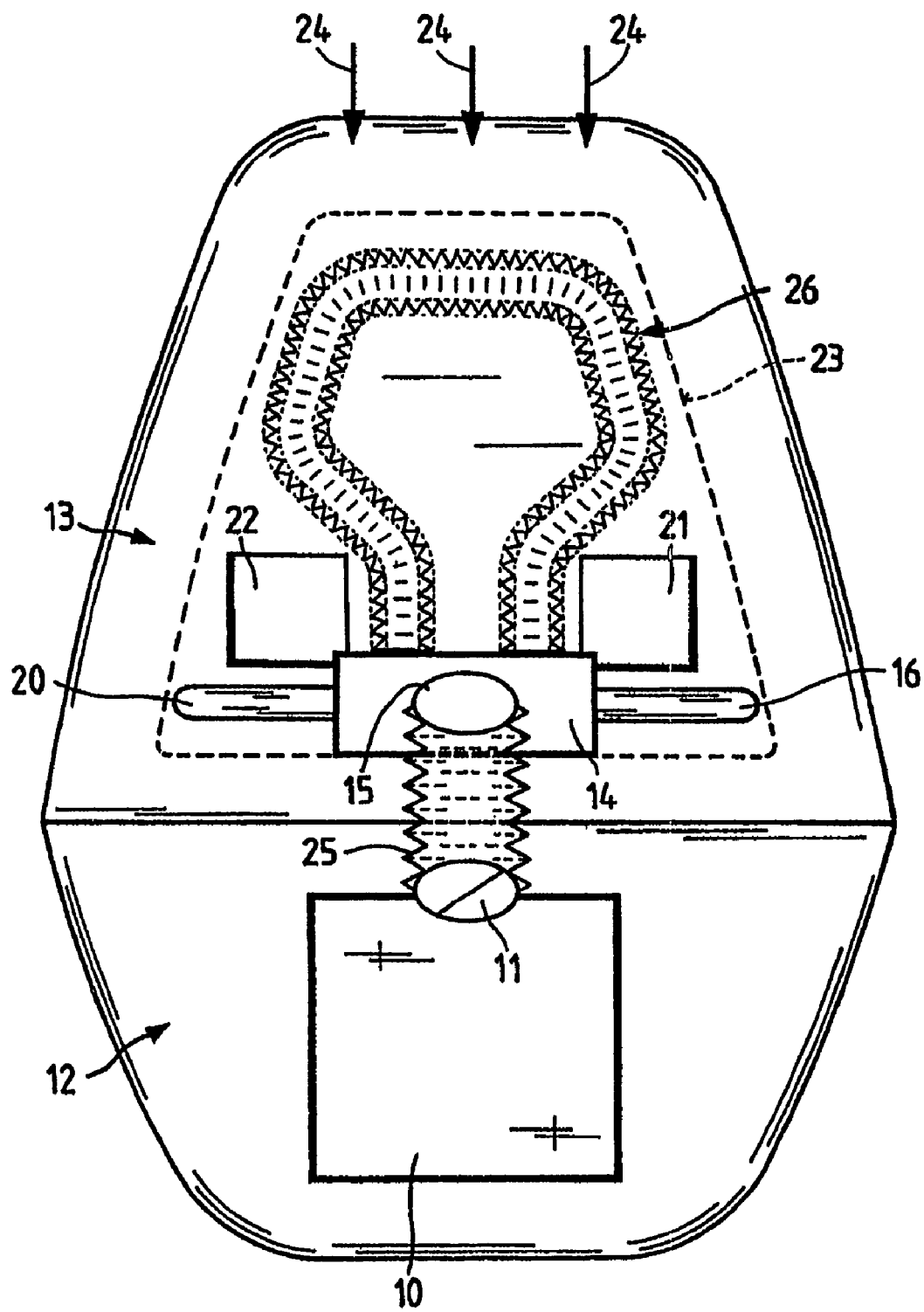
FIG. 2 shows the construction depicted in FIG. 1 with a modified filter variant.
Figure 3:
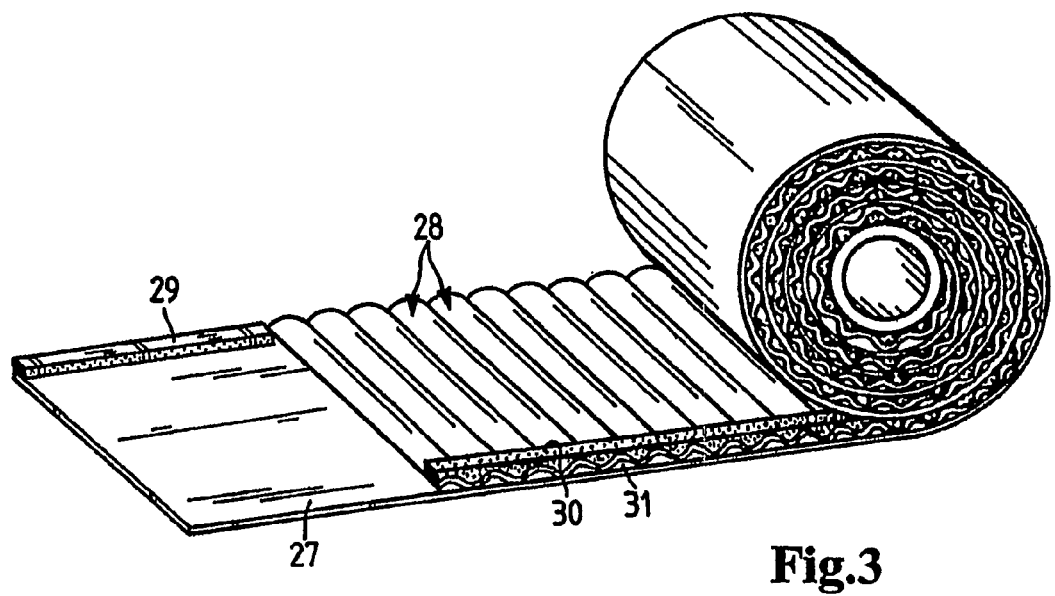
FIG. 3 is a perspective view of a wound filter element for installation in an engine hood.

FIG. 2 shows an alternate embodiment using a flexible tubular filter 26 connected to the intake plenum 14 in place of the static tubular filters. In this figure, components corresponding to those depicted in FIG. 1 are identified by the same reference numerals. The tubular filter 26 is formed of a nonwoven web or paper material with filtering properties. The filter medium itself has a plurality of parallel pleats arranged side by side and extending perpendicularly to the longitudinal axis of the filter. This makes possible a flexible installation of the filter medium adaptable to the structure of the engine hood. Of course, many different types of installation are feasible here. For high volume engines, in particular, it is possible to provide a correspondingly large active filtering surface.

Figure shows the filter medium as a wound filter element. This wound filter consists of a first, flat filter web 27 onto which is placed a second, corrugated web 28. Corrugated web 28 is glued to the flat web 27 by a bead of adhesive 29 on one side of the filter element. During winding, a bead of adhesive 30 is applied to the opposite side to join the corrugated web 28 to the previously wound flat web 27. This creates channels 31 which are open at one end so that air can enter. The air cannot escape on the opposite end, however, because the opposite end is closed by the adhesive. Instead, the air must pass through the corrugated filtering web, whereby it is filtered, into an adjacent channel which is open at the opposite end so that the now filtered air can exit from the opposite side. A wound filter of this type can, of course, also have an oval shape. Alternatively, the flat and corrugated layers can be stacked to form a cube as shown in FIG. 4.

Figure 4:
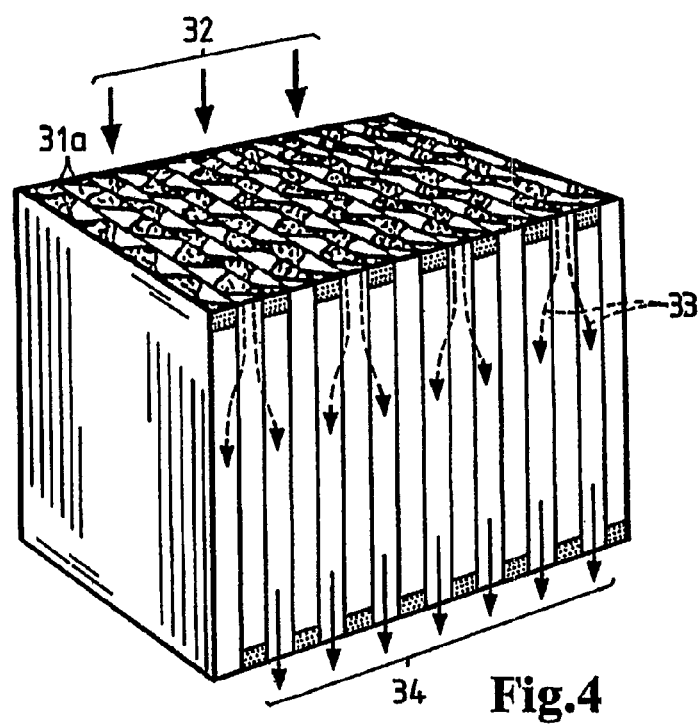
FIG. 4 is perspective view of a variant of a wound filter element for optimal adaptation to the structure of an engine hood.

FIG. 4 also illustrates the alternately closed openings of the individual channels. The unfiltered air enters the channels in the direction indicated by arrows 32, flows through walls of filter material separating adjacent channels as indicated by arrows 33, and leaves the filter element clean as indicated by arrows 34.

Figure 5:
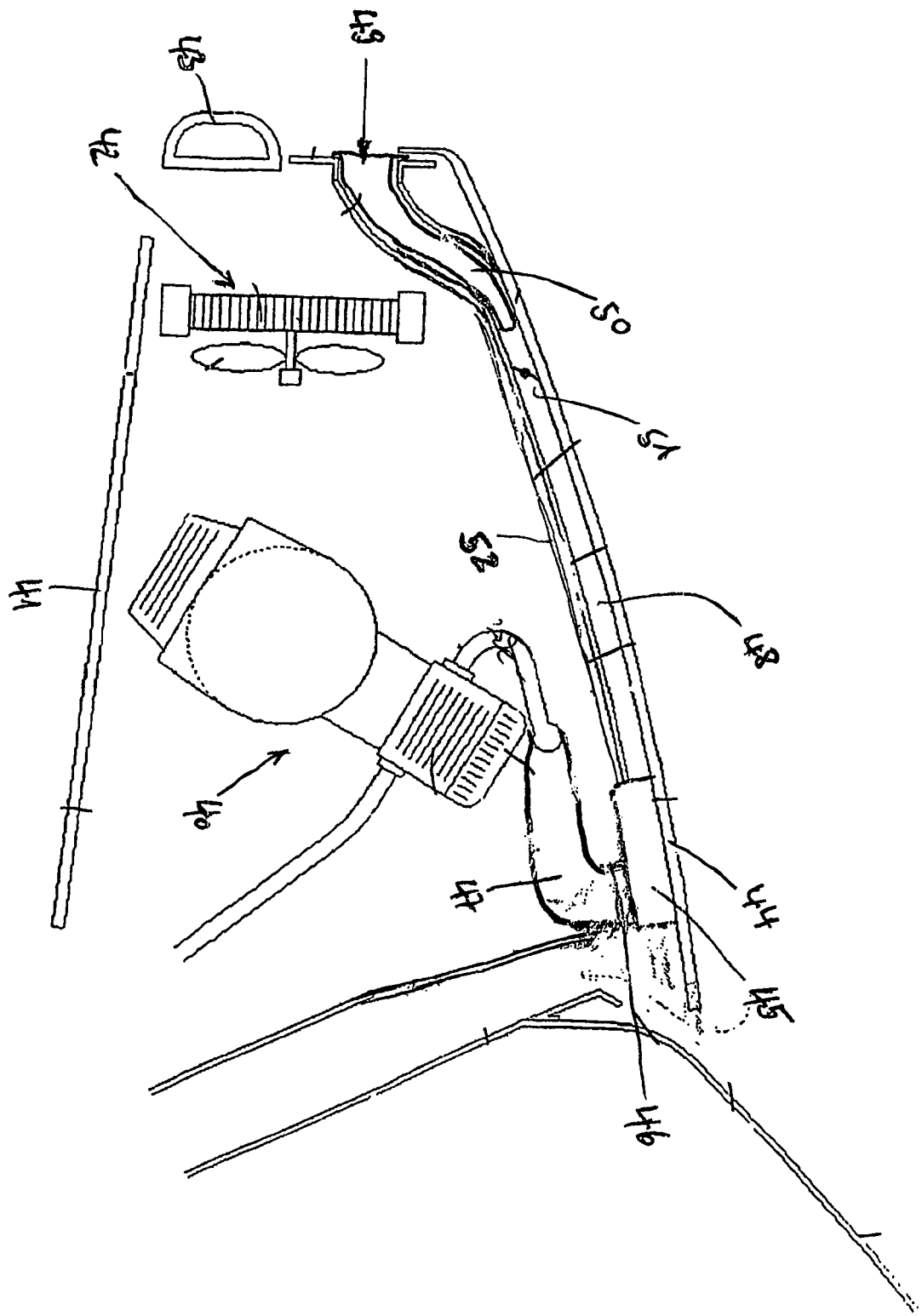
FIG. 5 is a schematic representation of an engine compartment of a motor vehicle.

FIG. 5 is a schematic view of the front end of a vehicle, including the internal combustion engine 40, which is mounted above a floor panel 41. A cooling system 42 is provided in front of the internal combustion engine. A bumper 43 is located in front of the cooling system 42. The engine compartment is closed by the engine hood 44. A plenum chamber 45 is mounted to the underside of the engine hood. An intake manifold 47 extends from this plenum chamber 45 through a connecting flange 46 to the internal combustion engine 40. At least one intake air duct 48 is associated with the plenum chamber 45. Each intake air passage 48 is likewise disposed directly on the underside of the engine hood 44 and extends to the air inlet 49. Air inlet 49 is disposed in the area of the front end of the internal combustion engine. A tubular filter 50 is disposed inside intake air passage 48 and extends from the air inlet 49 over a specific length of the intake air passage.

To reduce intake noise at the air inlet 49, a flap valve 51 may be provided in the intake air passage 48. This reduces the cross-section of the passage depending on the required air volume and thereby prevents sound radiation of the intake noise of the internal combustion engine. It is also possible to dispose this flap valve directly at the air inlet 49, optionally in front of the tubular filter 50. Below the intake air passage 48, a sound absorbing insulating mat 52 is provided, which simultaneously acts as the lining for a plurality of intake air passages. If the engine hood 44 can be opened, the intake manifold 47 is a pipe that is flexible over its length. This flexibility is obtained, for example, by pleating or by a telescopic construction. If the engine hood can be removed only for maintenance purposes, the intake manifold 47 can be made rigid. In this case, the intake manifold 47 must be detached at the connecting flange 46. In these cases, the connection between intake manifold 47 and connecting flange 46 can be a plug-in connection.

Figure 6:
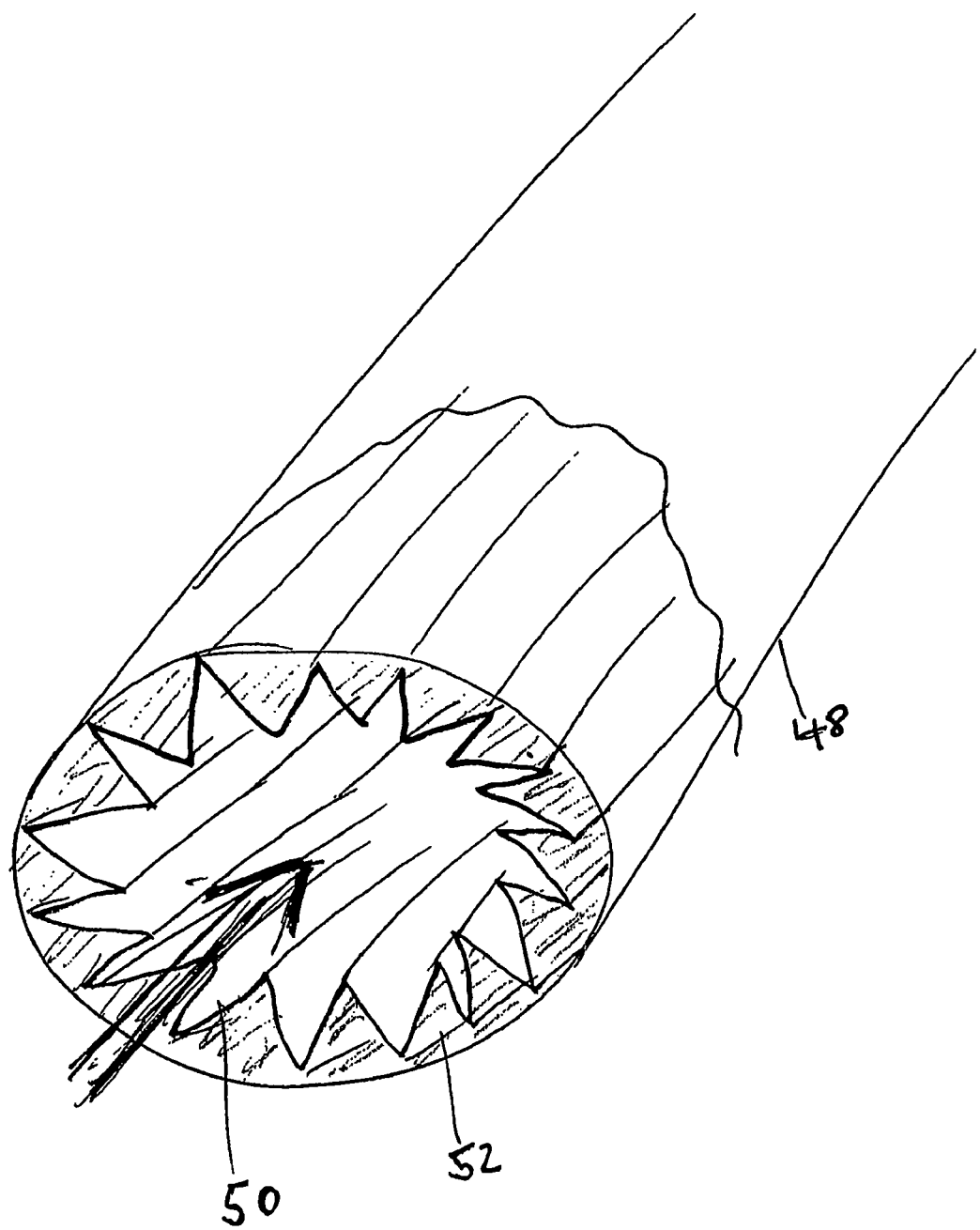
FIG. 6 is perspective representation of a pleated filter element.

FIG. 6 is a detail view of a tubular filter 50 which is pleated in longitudinal direction and disposed in a closed intake air passage 48. Unfiltered air flows into the interior of the tubular filter 50. This of course requires the hatched area 52 to be sealed, which is accomplished by a correspondingly configured flange. The air to be cleaned flows outwardly within the intake air passage 48 into the clean air area and then flows through the intake air passage to the plenum chamber 45.

Figure 7:
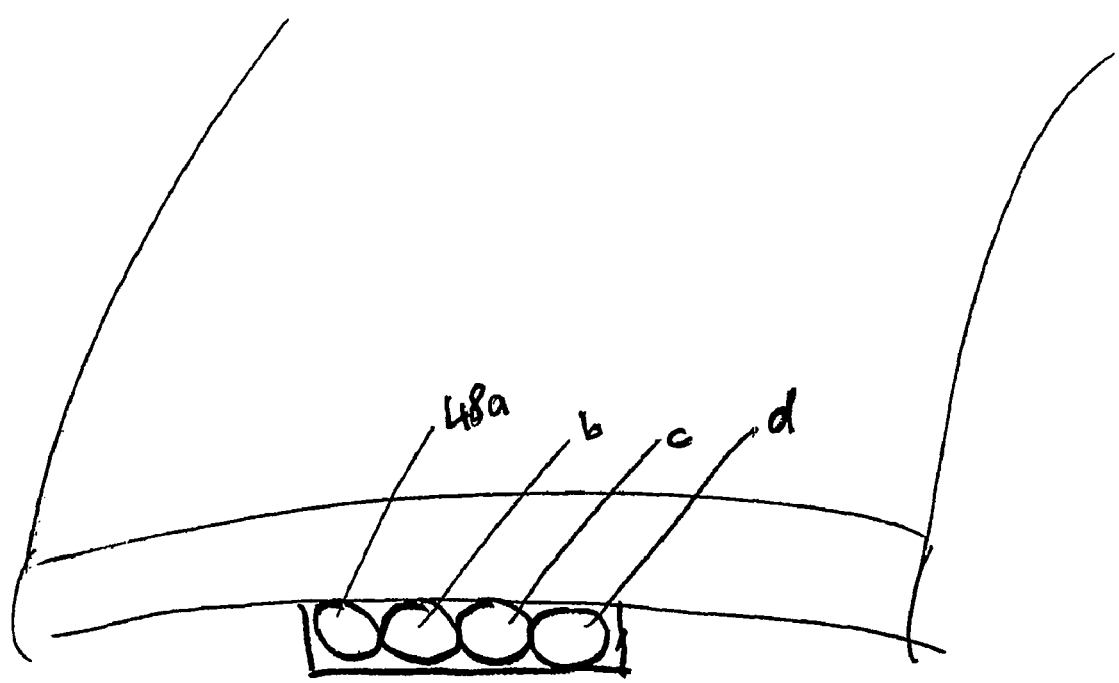
FIG. 7 is a front elevational detail view of the device illustrated in FIG. 5.

FIG. 7 is a front elevational detail view of a vehicle with the individual intake air passages 48*a-d* disposed in the area of the air inlet. It may be seen here that four individual intake air passages run to the plenum chamber. The advantage of individual intake air passages is that they can take different paths and can also detour around structures of the engine hood if necessary. At the entry of the intake air passages into the plenum chamber, the cross section abruptly changes. This abrupt change in cross section is necessary to improve the intake acoustics, i.e., to reflect sound waves. If the intake air passages are disposed on the underside of the engine hood it is advantageous to seal the openings relative to the engine compartment so that no hot air is drawn in, but fresh air from the area of the front end can be supplied in any case.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An intake filter for an internal combustion engine of a motor vehicle, said filter comprising
   an unfiltered air intake area,
   a filter medium, and
   a filtered air duct,
   wherein the unfiltered air intake area is disposed on the underside of the engine hood of the vehicle and is attached to the engine hood;
   wherein the filter medium comprises a tubular body mounted to and moving with the engine hood, the filter medium having a porosity such that adequate filtering of the intake air for the internal combustion engine is ensured;
   wherein the tubular body has a pleated geometry that facilitates a curved installation;
   wherein the tubular body is provided on the side opposite the engine hood with an elastic, resilient, substantially air-tight cover, said air-tight cover open toward the front of the vehicle and toward the front of the engine hood to draw in air; and
   wherein at least two intake air passages are provided in which the filter medium is arranged, each of said intake air passages extending directly under the engine hood between said engine hood and said elastic air-tight cover and opening into a common plenum chamber.

2. An intake filter according to claim 1, wherein the tubular body is a tubular filter having a diameter in the range from 40 to 80 mm.

3. An intake filter according to claim 1, wherein the filter medium has a plurality of side-by-side pleats arranged parallel to each other and perpendicular to the longitudinal axis of the tubular filter.

4. An intake filter according to claim 1, wherein the filter medium includes a resilient support element on at least one of the unfiltered air side and the filtered air side of the filter medium.

5. An intake filter according to claim 4, wherein said resilient support element comprises a helical support wire.

6. An intake filter according to claim 1, wherein the filter medium comprises a pleated structure in which the pleats extend longitudinally along the tubular body.

7. An intake filter according to claim 1, wherein each of said at least two intake air passages is provided with a filter medium in the form of a tubular body.

8. An intake filter according to claim 1, wherein a flap valve is arranged in the intake air passage in the vicinity of the air inlet which opens or closes depending on the air throughput.

9. An intake filter according to claim 1, wherein an intake manifold is provided for supplying filtered air from the plenum chamber to the internal combustion engine, said intake manifold being connected by an openable connecting nipple or by a flexible or telescopically movable hose or duct to the plenum chamber.

10. An intake filter according to claim 1, wherein the tubular body is a wound filter, which comprises a plurality of groove-shaped hollow channels, wherein adjacent channels are separated by a wall having filtering properties, and each channel is closed at one end, with adjacent channels being closed at alternating ends such that unfiltered air entering an open channel at one end of the filter must flow through a wall into an adjacent channel in order to exit the filter at the other end of the filter, whereby the air is filtered.

11. The intake filter according to claim 1, wherein the engine hood defines a surface of the unfiltered air intake area in cooperation with an airtight cover of the unfiltered air intake area.

12. The intake filter according to claim 1, wherein the engine hood defines a surface of a plenum chamber in fluid communication with the filtered air duct.

13. The intake filter according to claim 1, wherein the filter medium is movable with the engine hood when the engine hood is opened.

* * * * *